(12) United States Patent
Kallam et al.

(10) Patent No.: US 11,000,008 B2
(45) Date of Patent: May 11, 2021

(54) EQUINE MATTING

(71) Applicants: SMV Industries, Inc., Council Bluffs, IA (US); L&M Bag and Supply Co., Willacoochee, GA (US)

(72) Inventors: Jerry M. Kallam, Nashville, GA (US); James B. Taylor, Adel, GA (US); Carol W. Brown, Lebanon, TN (US)

(73) Assignee: SMV Industries, Inc., Council Bluffs, IA (US)

( * ) Notice: Subject to any disclaimer, the term of this patent is extended or adjusted under 35 U.S.C. 154(b) by 126 days.

(21) Appl. No.: 16/554,942

(22) Filed: Aug. 29, 2019

(65) Prior Publication Data

US 2021/0059209 A1 Mar. 4, 2021

(51) Int. Cl.
*A01K 1/015* (2006.01)

(52) U.S. Cl.
CPC ................................ *A01K 1/0157* (2013.01)

(58) Field of Classification Search
None
See application file for complete search history.

(56) References Cited

U.S. PATENT DOCUMENTS 7,001,112 B2 2/2006 Walsh

OTHER PUBLICATIONS

The Pennsylvania State University Agricultural and Biological Engineering Extension. Horse Stable Flooring Materials and Drainage article, 2002; Publication Distribution Center in alternative media.

*Primary Examiner* — Alexander S Thomas

(74) *Attorney, Agent, or Firm* — Michael P. Mazza; Michael P. Mazza, LLC

(57) ABSTRACT

Equine matting for a horse stall made of a composite textile of nonwoven fabric sewn to a plastic grid.

11 Claims, 3 Drawing Sheets

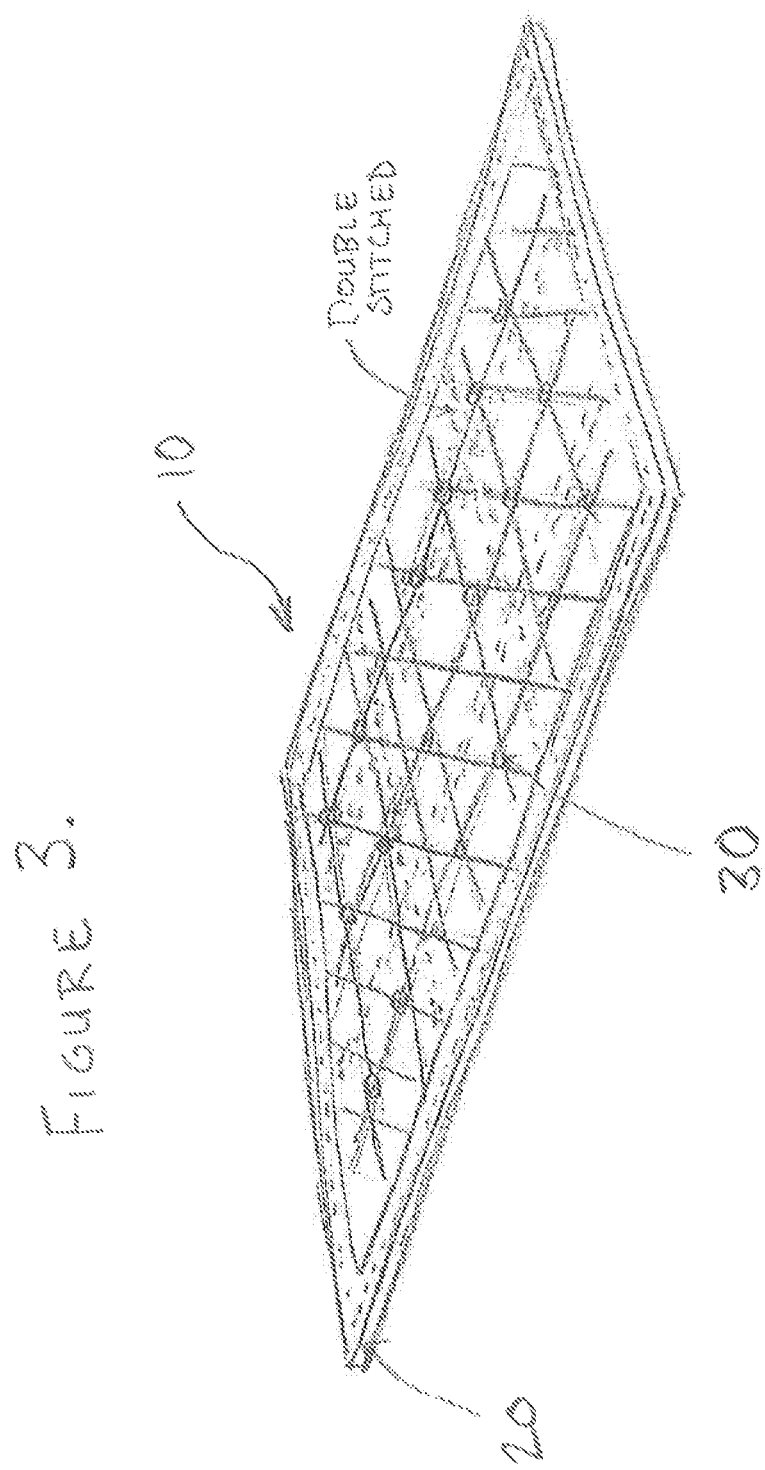

EQUINE MATTING

BACKGROUND OF THE INVENTION

The present invention generally relates to horse matting.

Analysis has shown that horse matting used in stalls should preferably possess a variety of characteristics, including that it: be dry (i.e., hydrophobic, such that liquid/urine passes through) and non-odor retentive (stall floors that retain odors can deteriorate the respiratory system of the horse); provide traction and be non-slippery to encourage the horse to lie down, while allowing the horse to regain his footing without injury; be easy on the legs and have some "give" to decrease tendon and foot strain; be durable with a long life, and stay level and resist damage from horse pawing; have low maintenance such that it is easy to clean and maintain; be affordable; and be lightweight.

Two major categories of stable flooring materials depend on whether the material is porous or impervious to liquid. Porous floors may be made of sand and/or gravel to absorb liquid into the ground below the stable. However, porous materials such as soil or clay are less capable of bearing weight, and can work their way into adjacent areas through hoof action, creating holes and high spots. Impervious floors may be sloped toward a drain so that urine and water can run out of the stall. Stall design can increase cost, of course, and already-designed stalls with impervious floors must use an absorbent floor mat or deal with the negative consequences. Even porous floors must be maintained, as sand and/or gravel will flow away over time and will need to be added. Different floor types have advantages and disadvantages, of course. For example, while concrete floors can provide drainage, they are tough on a horse's legs. Similarly, wood floors are easier on a horse's leg, but not as durable, and also flammable.

A 1,000-pound horse may produce about 31 pounds of feces and ⅔ gallons of urine daily, so a non-absorbent floor mat, without a draining floor, can quickly become problematic. Conversely, flooring materials that allow urine to be absorbed and travel down through the flooring material layers can retain odors.

Several available products provide alternatives to the historical rubber stall mat. None has been successfully in the retail marketplace. Rubber stall mats have historically been the market leader. In the retail marketplace, the most common horse matting options are 4-foot by 6-foot, and 3-foot by 5-foot (¾-inch thick) standard rubber mats, as well as a ¼-inch thick rubber mat in varying lengths that is rolled and displayed in a plastic bag. This second option is more of a portable option useful in a horse trailer or aisleway rather than in a stall, and it does not offer shock absorption as with the standard rubber mat.

Disadvantages of rubber mats include cost, weight and lack of absorbency. For example, the standard 4-foot by 6-foot, ¾-inch thick rubber mat weighs over 100 pounds, and is not absorbent, requiring wood shavings or other absorbent material (dirt, clay, etc.) to be added over the top of the mat, adding to its maintenance.

"Grid" horse mats are known in which a plastic grid is provided over a porous foundation such as gravel, and the plastic grid is covered with a lumber grid. Grid mats have advantages, including relatively low maintenance, using less bedding than concrete, remaining level, and being relatively durable and easy on the legs, but grid mats are relatively expensive, and their longevity is expected to be less than rubber or plastic.

A stall mat that uses a geotextile fabric is also known. See: https://www.stallsavers.com/index.php/about-stall-savers/videos/18-articles/36-use-of-geotextiles-in-livestock-areas. However, this product has no structural backing, and testing on this product showed that it did not allow liquid to pass through the matting into the soil below, instead trapping urine in the mat (requiring the mat to be hung to allow the urine to run out).

Accordingly, it would be advantageous to provide a horse mat with the above-referenced preferred characteristics.

SUMMARY OF THE INVENTION

The objects mentioned above, as well as other objects, are solved by the present invention, which overcomes disadvantages of prior equine matting, while providing new advantages not previously associated with such matting.

This summary is provided to introduce a selection of concepts in a simplified form that are further described below in the Detailed Description, so that the claimed invention may be better understood. However, this summary is not intended to limit the scope of the claimed subject matter.

In a preferred embodiment of the present invention, an equine mat for use in covering a surface of a horse stall includes a composite textile of nonwoven, hydrophobic polyester fibers which are randomly oriented and sewn to a plastic grid. The equine mat is installed with the plastic grid side face down, adjacent the horse stall surface, allowing liquid to pass through the mat and into the horse stall surface. Preferably, the nonwoven fabric is a single layer of polyester staple fibers which are made by needle-punching. Preferably, the plastic grid is punched and drawn polypropylene. The nonwoven fabric and plastic grid may be stitched together using a double head, locking stitch machine. The mat is sufficiently rigid and yet in larger sizes may be folded and rolled.

In a particularly preferred embodiment, the nonwoven fabric is a combination of polyester fiber, and bicomponent polyester.

Preferably the weight of the nonwoven fabric is between about 27-33 ounces/square yard, and the grab tensile of the nonwoven fabric is no less than about 300×500 pounds. Also, in this embodiment, preferably, the overall flexural rigidity of the mat is not less than about 1,500,000 mg-cm.

In another preferred embodiment, an equine mat is made of a composite textile of nonwoven fabric sewn to a single layer of plastic grid, in which the overall flexural rigidity of the mat is not less than about 1,500,000 mg-cm. With this embodiment, preferably the grab tensile of the mat is no less than about 300×500 pounds. The mat components of a single layer of nonwoven fabric sewn to a single layer of plastic grid may be similar as in the earlier embodiment described immediately above.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Lightweight" means a composite textile mat weight of equal to or less than about 70 ounces/square yard.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 3 is a schematic, perspective view showing a bottom-side view of the composite textile mat (the plastic geogrid lays on the stall surface).

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Figure 1:
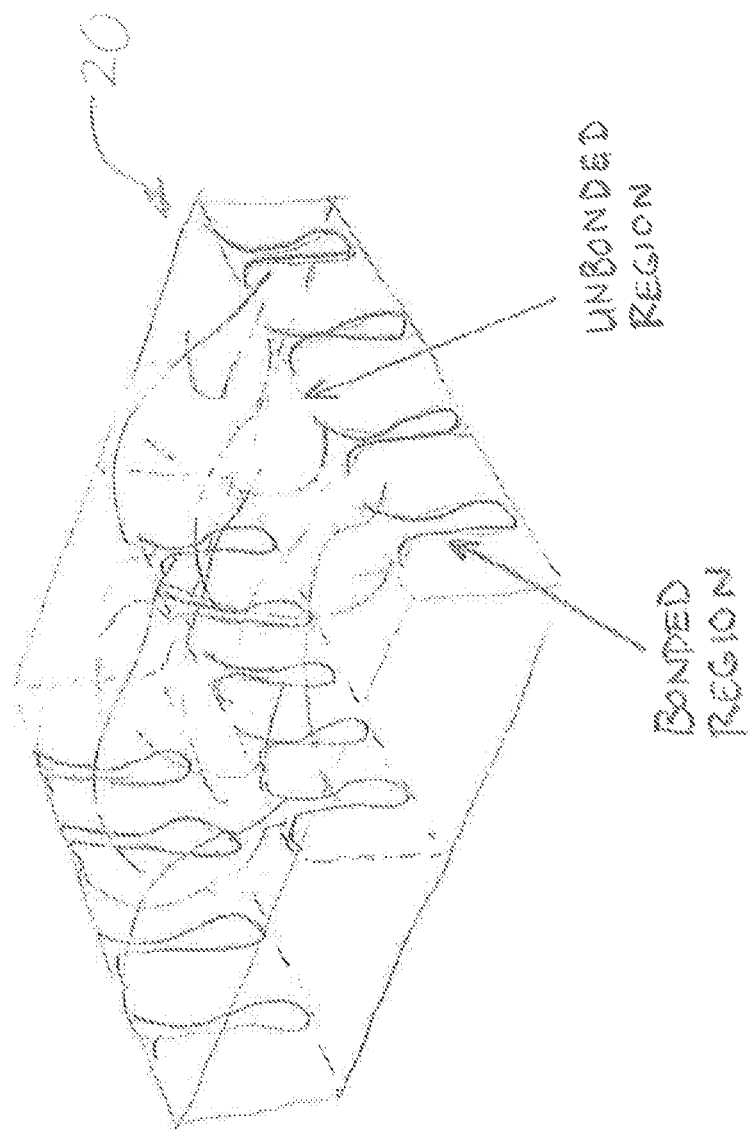
FIG. 1 is a schematic, perspective view of the structure of a needle-punched nonwoven fabric, showing the unbonded area where the needles do not touch, and the bonded area where the needles make a protrusion and lock the nonwoven fibers together.
Figure 2:
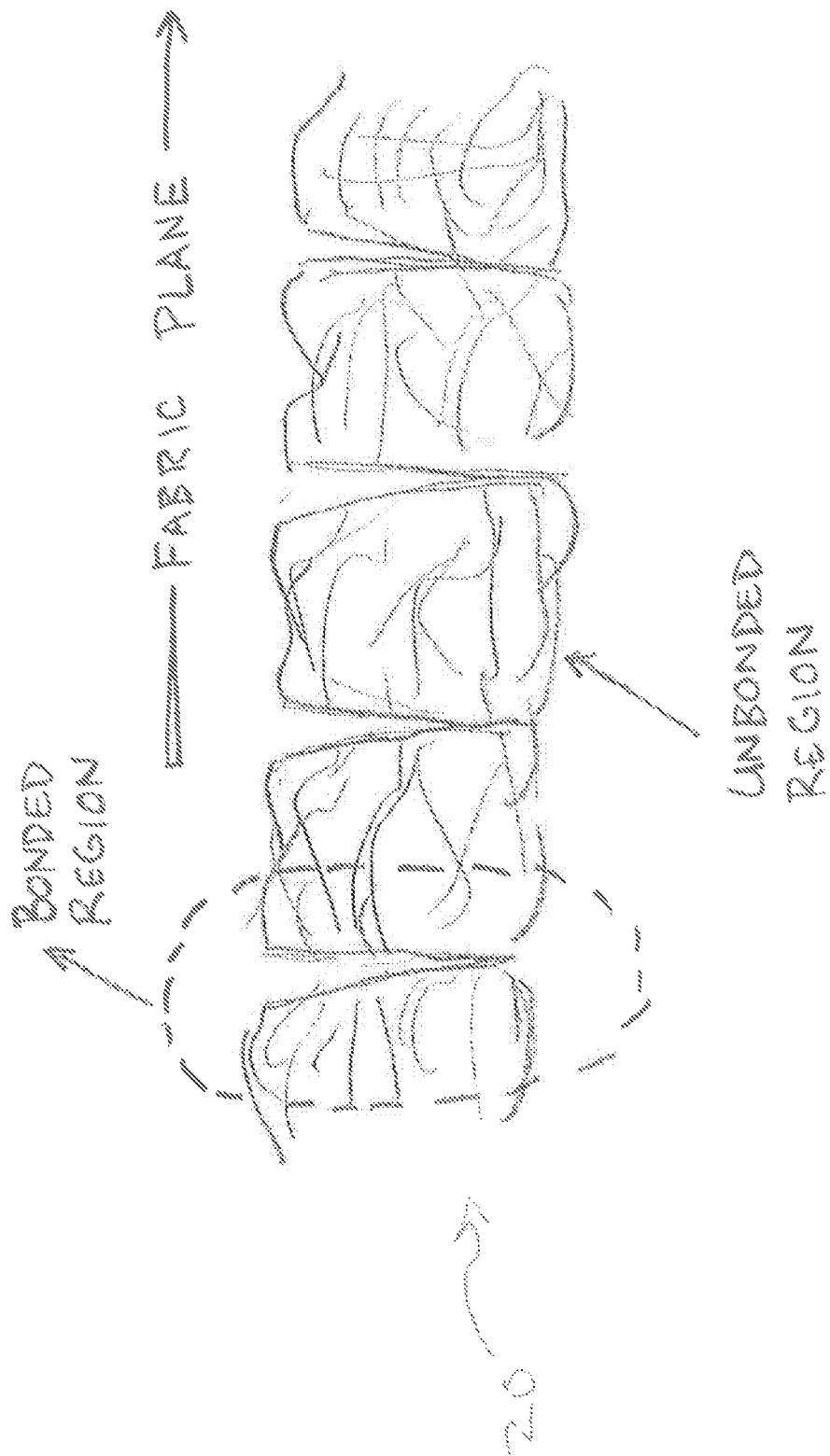
FIG. 2 is a schematic, planar view of the nonwoven fabric.

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

In the preferred embodiment, a horse mat is provided which consists of a composite textile 10 manufactured of nonwoven fabric 20 sewn to a plastic grid 30. As discussed below, the plastic grid provides stabilization to the composite textile mat, providing the mat with sufficient rigidity and enabling it to lay flat, while the nonwoven fabric provides a sufficient degree of compressibility to the mat. (It has been found that woven products provide neither sufficient filtration nor sufficient cushion.)

Preferably the fabric consists of a single layer of nonwoven polyester staple fiber, with the nonwoven polyester fibers being randomly oriented to form a cohesive, stabilized needle-punched fabric. (Continuous filament or spun-bound manufacturing processes could be used, but it would not be economical. Further, two or more nonwoven textile layers should not be used to make the fabric because the combination of two similar nonwoven materials do not react in the same manner as a single layer of nonwoven does.) The nonwoven fabric also preferably constitutes a super hydrophobic textile, such that it does not allow urine to remain in the matting. One preferred example is a blended fiber of: 70% polyester fiber; and 30% bico (bicomponent), low-melt polyester.

Preferably the plastic grid is a punched and drawn polypropylene grid. One preferred example of the material which may be used for the polypropylene grid is Tensar TriAxial Geogrid TX130. The Tensar Triax TX 130 polypropylene grid may be a geogrid product made under U.S. Pat. No. 7,001,112, for example. Instead of Tensar Triax TX 130, mats larger than 4-foot by 6-foot (e.g., 10'×10', etc.) may use Synteen SF112 Geogrid, which is a woven polyester PVC-coated product. Synteen SF112 provides the flexibility to fold and roll the finished product.

The composite textile may be stitched together using a Consew double head, locking stitch machine. A 90 Tex high UV black thread may be used to stitch the composite textile together. The edges of the mat may be sewn together with a textile tape, providing preferably not less than a 2.75-inch total width. The stitching count should be at least 4 stitches/inch.

The composite textile mat preferably has molecular weight and molecular characteristics which impart: (a) high resistance to deformation when subjected to applied force in use; and (b) high resistance to loss of load capacity or structural integrity when subjected to long-term environmental stress such as UV exposure or animal waste. For example, the overall flexural rigidity of the composite textile mat (a measure of the total stiffness of the mat and how it will lay flat in the stall) is preferably not less than 1,500,000 mg-cm (per ASTM D7748).

Preferably, the horse mat, such as the preferred mat disclosed here, resists ultra violet deterioration, rotting, and biological degradation, and is inert to commonly encountered soil chemicals.

The horse mat should be designed to be used as a stall mat, and therefore designed for use in the care and keeping of animals, primarily in the equine trade.

Preferably, no chemicals are used on the mat to bond or coat any of the textile materials, other than what the manufacturer provides. The mat is preferably hypoallergenic and inert to biological matter.

Testing of the currently-developed horse mat described here yields Minimum Average Roll Values, showing that this product will meet and exceed the following parameters:

| PROPERTY | TEST METHOD | MARV English |
| --- | --- | --- |
| Thickness | ASTM D-5199 | 360 mils |
| Mass/Unit Area | ASTM D-5261 | 70 oz/sq. yd |
| Grab Tensile | ASTM D-4632 | 333 × 530 lbs |
| Abrasion Resistance | ASTM D-4886 | 500 × 1000 lbs |
| Puncture | ASTM D-4833 | 309 lbs |
| Air Permeability | ASTM D-737 | 58 ft$^3$/min/ft$^2$ |
| UV Resistance (500 hrs) | ASTM D-4355 | 80% |
| Apparent Opening Size (AOS)* | ASTM D-4751 | 200 US Std. Sieve |
| Permittivity | ASTM D-4491 | .47 sec$^{-1}$ |
| Water Flow Rate | ASTM D-4491 | 1426 gpm/ft$^2$ |

*Mininum Average Roll Valve
*Proposition 65 Compliant

Preferably, the nonwoven textile used in the horse mat should not fall below 29 ounces/square yard (oz/sy). Preferably, the overall weight range of the composite textile mat is between 65-75 oz/sy, with a grab tensile of no less than 300×500 lbs (per ASTM D4632).

Mat coloration (e.g., gray, black, brown, blue, green and purple) can vary. Mat sizes can also vary, such as 3-foot by 5-foot, 4-foot by 6-foot, or custom widths for larger panel sizes.

An additional advantage to the mat described here is that a 4-foot by 6-foot mat weight only about 14 pounds, which is highly desirable as compared to a similarly-sized rubber mat which weighs about 109 pounds. Additionally, testing has shown that the mat of the instant invention filters liquid into the earth rather than puddling on top of the mat, or locking liquid in the mat.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

We claim:

1. A lightweight equine mat covering a surface of a horse stall, comprising a composite textile of nonwoven fabric sewn to a plastic grid, wherein the equine mat is oriented such that the plastic grid lies adjacent the horse stall surface.

2. The lightweight equine mat of claim 1, wherein the nonwoven fabric comprises a single layer of polyester staple fibers.

3. The lightweight equine mat of claim 2, wherein the polyester fibers are randomly-oriented.

4. The lightweight equine mat of claim 1, wherein the nonwoven fabric comprises a needle-punched fabric.

5. The lightweight equine mat of claim 1, wherein the plastic grid comprises punched and drawn polypropylene.

6. The lightweight equine mat of claim 1, wherein the nonwoven fabric is hydrophobic.

7. The lightweight equine mat of claim 1, wherein the nonwoven fabric comprises a combination of polyester fiber, and bicomponent polyester.

8. The lightweight equine mat of claim 1, wherein the nonwoven fabric and plastic grid are stitched together using a double head, locking stitch machine.

9. The lightweight equine mat of claim 1, wherein the weight of the mat is between about 65-75 ounces/square yard.

10. The lightweight equine mat of claim 1, wherein the overall flexural rigidity of the mat is not less than about 1,500,000 mg-cm.

11. The lightweight equine mat of claim 1, wherein the grab tensile of the mat is no less than about 300×500 pounds.

* * * * *